US009558296B2

(12) United States Patent
Gruetzner et al.

(10) Patent No.: US 9,558,296 B2
(45) Date of Patent: Jan. 31, 2017

(54) METHOD FOR PROCESSING A GRAPH CONTAINING A SET OF NODES

(75) Inventors: Matthias Gruetzner, Schoenaich (DE); Witold Szczeponik, Heidelberg (DE); Stefan Puehl, Roedermark (DE); Marc Fiammante, St. Laurent du Var (FR)

(73) Assignee: International Business Machines Corporation, Armonk, NY (US)

( * ) Notice: Subject to any disclaimer, the term of this patent is extended or adjusted under 35 U.S.C. 154(b) by 1038 days.

(21) Appl. No.: 12/353,195

(22) Filed: Jan. 13, 2009

(65) Prior Publication Data

US 2009/0138686 A1 May 28, 2009

(30) Foreign Application Priority Data

Jan. 16, 2008 (EP) .................................... 08150323

(51) Int. Cl.
*G06F 17/30* (2006.01)
(52) U.S. Cl.
CPC ............................. *G06F 17/30958* (2013.01)
(58) Field of Classification Search
CPC ............... G06F 17/30958; G06F 17/30961
USPC .................................................. 707/797, 798
See application file for complete search history.

(56) References Cited

U.S. PATENT DOCUMENTS

| 6,065,009 | A  | * | 5/2000  | Leymann et al. |
| 6,662,355 | B1 |   | 12/2003 | Caswell et al. |
| 6,850,924 | B2 | * | 2/2005  | Grimse et al. ................... 706/59 |
| 7,039,702 | B1 | * | 5/2006  | Churchyard ................... 709/224 |
| 7,509,604 | B1 | * | 3/2009  | Koelbl et al. .................. 716/108 |
| 8,515,983 | B1 | * | 8/2013  | Snyder, II ......... G06F 17/30985 707/760 |
| 2002/0116244 | A1 | * | 8/2002 | Honarvar et al. ................. 705/7 |
| 2005/0256818 | A1 | * | 11/2005 | Sun et al. ....................... 706/46 |
| 2005/0289088 | A1 | * | 12/2005 | Tian et al. ....................... 706/1 |
| 2006/0161560 | A1 | * | 7/2006  | Khandelwal ...... G06F 17/30675 |
| 2006/0282474 | A1 | * | 12/2006 | MacKinnon, Jr. .... G06F 9/4436 |
| 2007/0118551 | A1 | * | 5/2007  | Akkiraju et al. ............. 707/102 |
| 2008/0235211 | A1 | * | 9/2008  | Saund ............... G06F 17/30961 |

OTHER PUBLICATIONS

Component business modeling, IBM, http://www-935.ibm.com/services/us/gbs/bus/html/bcs_componentmodeling.html (CBM), Oct. 2008.

Arsanjani, "Service-Oriented Modeling and Architecture," www.ibm.com/developerworks/webservices/library, Nov. 9, 2004.

* cited by examiner

*Primary Examiner* — Shew-Fen Lin
(74) *Attorney, Agent, or Firm* — Steven M. Greenberg, Esq.; CRGO Law (57) ABSTRACT

The invention relates to a computerized method for processing a graph containing a set of nodes processing a graph containing a set of nodes, wherein forest of trees is provided corresponding to a directed acyclic graph containing a set of nodes, each of said nodes having a type chosen from a set of types; a depth for each node in said forest of trees is determined; in a breadth-first traversal manner, the depth and type of each node in said forest of trees is compared to a predefined matrix, said matrix defining for each depth and type combination one of the following actions to be carried out: no action, creating a new sub-tree, triggering exception handling.

11 Claims, 10 Drawing Sheets

|  | Level 1 | Level 2 | Level 3 | Level 4 |
|---|---|---|---|---|
| Observation | Allowed | Allowed | Allowed | Allowed |
| Control | Not allowed | Allowed | Allowed | Allowed |
| Invocation (Call without Human Interaction) | Allowed | Allowed | Allowed | Allowed |
| Invocation (Call with Human Interaction) | Not allowed | Not allowed | Allowed | Not allowed |

|  | Level 1 | Level 2 | Level 3 | Level 4 |
|---|---|---|---|---|
| Observation | No-op | No-op | No-op | No-op |
| Control | Create new sub-process, move old node down | No-op | No-op | No-op |
| Invocation (Call without Human Interaction) | No-op | No-op | No-op | No-op |
| Invocation (Call with Human Interaction) | Create new sub-process, move old node down | Create new sub-process, move old node down | No-op | Raise exception |

METHOD FOR PROCESSING A GRAPH CONTAINING A SET OF NODES

CROSS-REFERENCE TO RELATED APPLICATIONS

This application claims priority under 35 U.S.C. 119(a) to European Patent Application Serial Number 08150323.7 filed Jan. 16, 2008 entitled "A METHOD FOR PROCESSING A GRAPH CONTAINING A SEST OF NODES" the entirety of which is incorporated herein by reference.

FIELD OF THE INVENTION

The invention relates to a computerized method for processing a graph containing a set of nodes.

BACKGROUND OF THE INVENTION

Information technology (IT) and respective IT tools are needed to implement business processes. However, business process models on the one hand are mostly developed independently from IT design models for implementing these processes. Models known in the art for doing one of these tasks are e.g. the Service-Oriented Modeling and Architecture (SOMA) by International Business Machines Corporation, Armonk, N.Y., as a design model or Component Business Modeling (CBM) by International Business Machines Corporation, Armonk, N.Y., as a business analysis model. The successful use of such models typically requires a high effort in training as well as many years of experience.

U.S. Pat. No. 6,662,355 B1 discloses a model and a system which can be used for specifying and implementing automation of business processes. The model can be used by both business process as well as the respective IT design to be developed for the business process and provides guidelines on how to map a business process.

SUMMARY OF THE INVENTION

It is an object of the invention to provide a computerized method which allows to checking and modifying a business process model automatically. Other objects of the invention are to provide a computer program product and a computer system for performing such a method.

These objects are achieved by the features of the independent claims. The other claims and the specification disclose advantageous embodiments of the invention.

A computerized method is proposed for processing a graph containing a set of nodes, said method comprising the steps of
- providing a forest of trees corresponding to a directed acyclic graph containing a set of nodes, each of said nodes having a type chosen from a set of types;
- determining a depth for each node in said forest of trees;
- in a breadth-first traversal manner, comparing the depth and type of each node in said forest of trees to a predefined matrix, said matrix defining for each depth and type combination one of the following actions to be carried out: no action, creating a new sub-tree, triggering exception handling.

Favorably, the proposed method allows the checking of the compliance of a given business process model with a model underlying the predefined matrix and automatically normalizing the given model to the underlying model. Thus, a business process model which does not comply with the underlying model can be automatically repaired and brought into compliance with the underlying model. If this normalization should fail, the exception handling is triggered. In this case the method not only reveals that given model does not comply with the underlying model but also hints as to why the given model is not compliant.

By structuring business processes into semantic levels the underlying model provides a structure for designing business process models as well as also decomposing business processes into purely business related and IT related domains. Business related domains are normally handled by analysts who do not consider IT problems. IT related domains are usually handled by IT architects who do not consider analyzing business processes. Favorably, the method according to the invention helps to understand the requirements and responsibilities of development tools for both domains.

The invention can be the basis for a blue print or template in tooling to facilitate tool handling and increases the efficiency of the model verification with the tool. The invention is applicable for efficiently linking fusing business and IT related process efforts.

The technique of the method is technology agnostic and can be used in diverse environments. Business processes represented by various model tools known in the art can be handled with the method according to the invention.

According to an independent aspect of the invention a computer program product comprising a computer useable medium including a computer readable program, wherein the computer readable program when executed on a computer causes the computer to
- provide a forest of trees corresponding to a directed acyclic graph containing a set of nodes, each of said nodes having a type chosen from a set of types;
- determine a depth for each node in said forest of trees;
- compare the depth and type of each node in said forest of trees to a predefined matrix, said matrix defining for each depth and type combination one of the following actions to be carried out: no action, creating a new sub-tree, triggering exception handling.

According to a further independent aspect of the invention a computer system is proposed for execution of a data processing program comprising software code portions for performing, when said program is run on said computer, a method for processing a graph containing a set of nodes, said method comprising
- providing a forest of trees corresponding to a directed acyclic graph containing a set of nodes, each of said nodes having a type chosen from a set of types;
- determining a depth for each node in said forest of trees;
- in a breadth-first traversal manner, comparing the depth and type of each node in said forest of trees to a predefined matrix, said matrix defining for each depth and type combination one of the following actions to be carried out: no action, creating a new sub-tree, triggering exception handling.

BRIEF DESCRIPTION OF THE DRAWINGS

The present invention together with the above-mentioned and other objects and advantages may best be understood from the following detailed description of the embodiments, but not restricted to the embodiments, wherein is shown in.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION OF EXAMPLE EMBODIMENTS

According to the invention, a computerized method for processing a graph containing a set of nodes comprises the steps of providing a forest of trees corresponding to a directed acyclic graph containing a set of nodes, each of said nodes having a type chosen from a set of types; determining a depth for each node in said forest of trees; in a breadth-first traversal manner, comparing the depth and type of each node in said forest of trees to a predefined matrix, said matrix defining for each depth and type combination one of the following actions to be carried out: no action, creating a new sub-tree, triggering exception handling.

Figure 1:
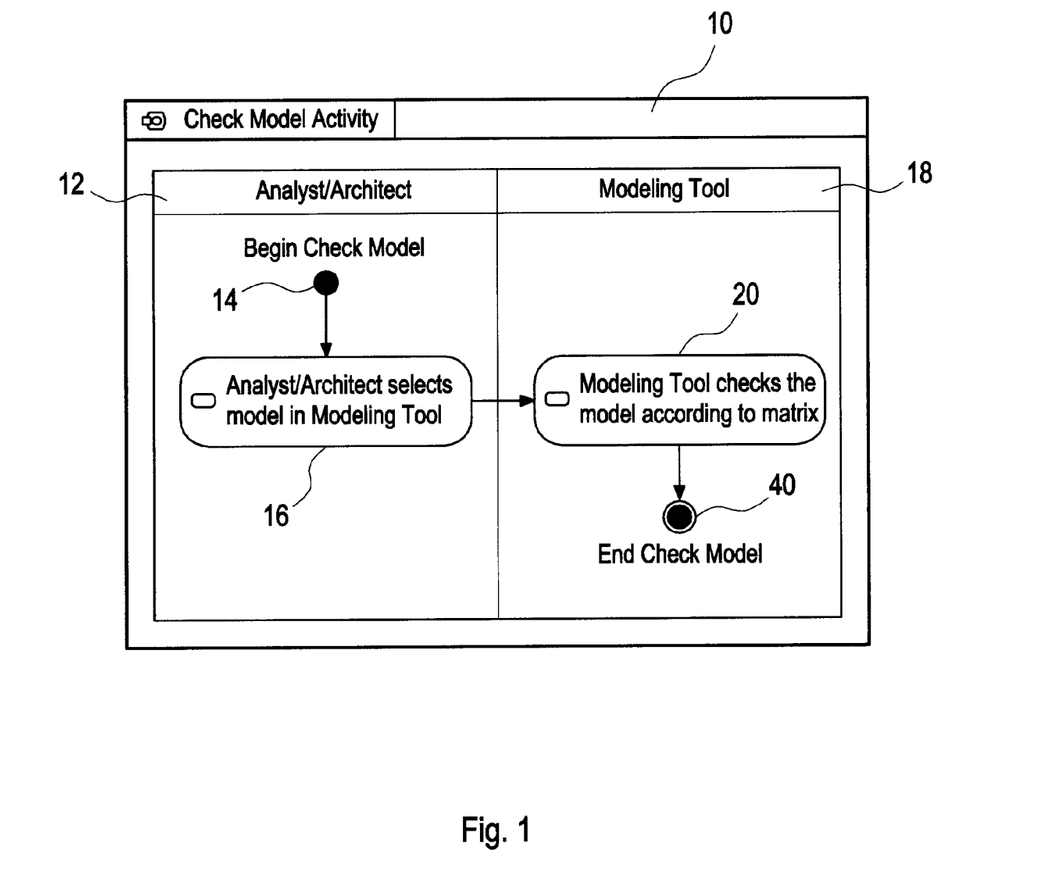
FIG. 1 a first preferred embodiment of the method according to the invention for automatic checking a given model.

To clarify the computerized method according to the invention, FIG. 1 depicts a first preferred use case as a first step of the computerized method wherein a given model, particularly a business model, is checked in a modeling tool 18. Particularly, the compliance of the given model with an underlying model comprised in the preferred method is checked. In an activity 10 a given model is checked. A first actor 12, such as a business analyst or an IT architect, begins model check in step 14 and selects a model in a modeling tool in step 16. The actor 12 requests a task from a second actor 18, i.e. the modeling tool, to check the model according to a model contained in the preferred method in step 20. The check model process ends in step 40. The modeling tool can be any modeling tool known in the art. An implementation can favorably choose to use context sensitive menus to trigger this use case. Presentation of the results of the check is typically part of some other use case and can be done by common tools not described here.

It becomes evident that the method can guide the actor, e.g. a business analyst or an IT architect, during the analysis and design phase for process identification and specification. A new tool is proposed, that provides a structure in the business process modeling domain as well as a template for the actual modeling of a business process. The method can also provide a definition of the representation of business processes and can perform business process modeling by providing a structure for business process decomposition into business and IT domains.

Figure 2:
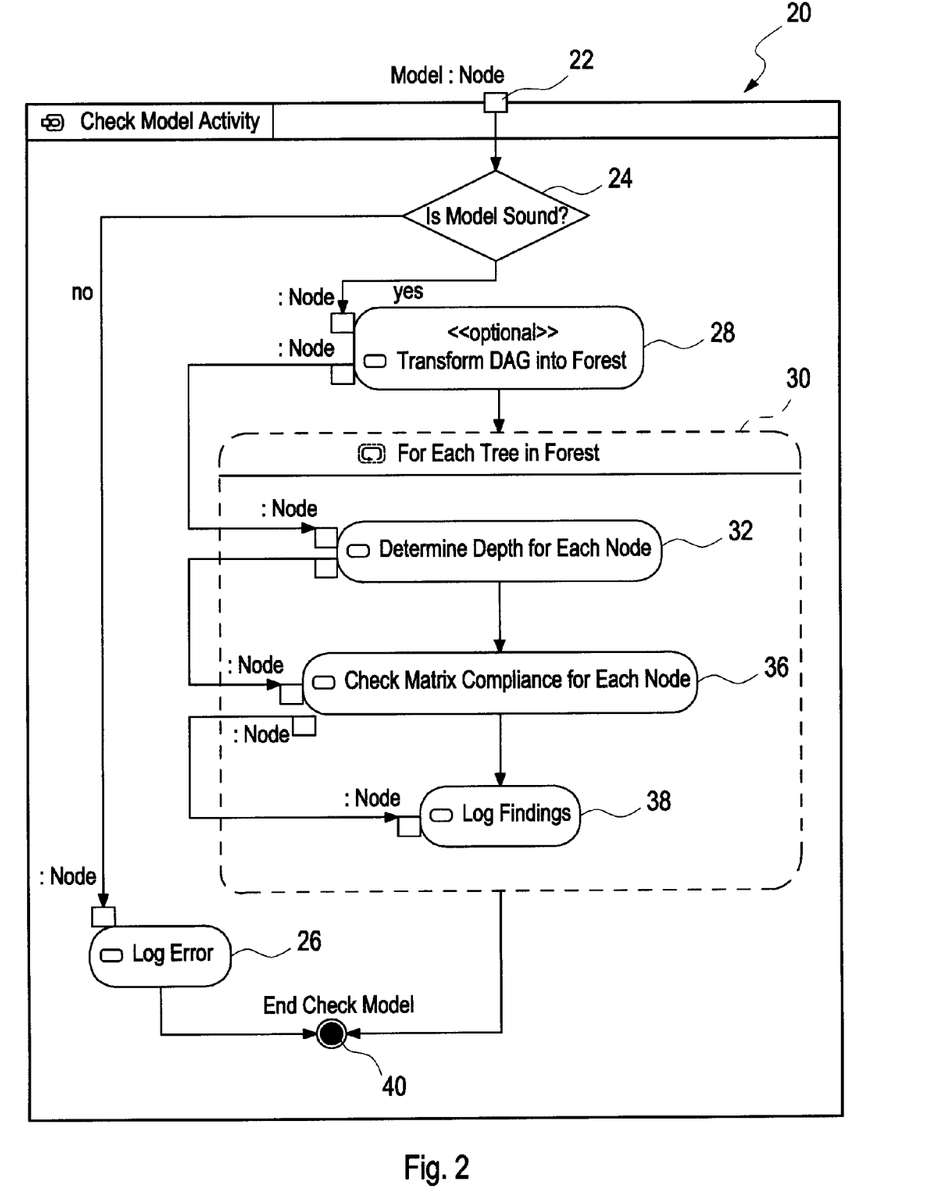
FIG. 2 a detailed process in the first preferred embodiment of the method according to the invention.

Referring to FIG. 2 details of the model check in step 20 are shown. It is assumed that the model which is to be checked is represented by a directed, acyclic graph (DAG).

The model is entered at node 22 and checked if the model is sound (step 24). The model is considered sound if there are no loops and all nodes are connected. If the model is not sound, an entry in a log error is made (step 26). If the model is sound, the directed, acyclic graph is transformed into a forest of trees, if necessary, to simplify the further processing of the model (optional step 28). For each tree in the forest (step 30), the depth of each node is determined (step 32) and the compliance of each node with the underlying model comprised in the method is checked (step 36). The nodes have a node type chosen from a set of types. Any findings are logged (step 38), e.g. errors and observations and can be examined by the actor 18 with appropriate means outside the model check. When all trees have been checked, the model check ends (step 40).

Figure 3A:
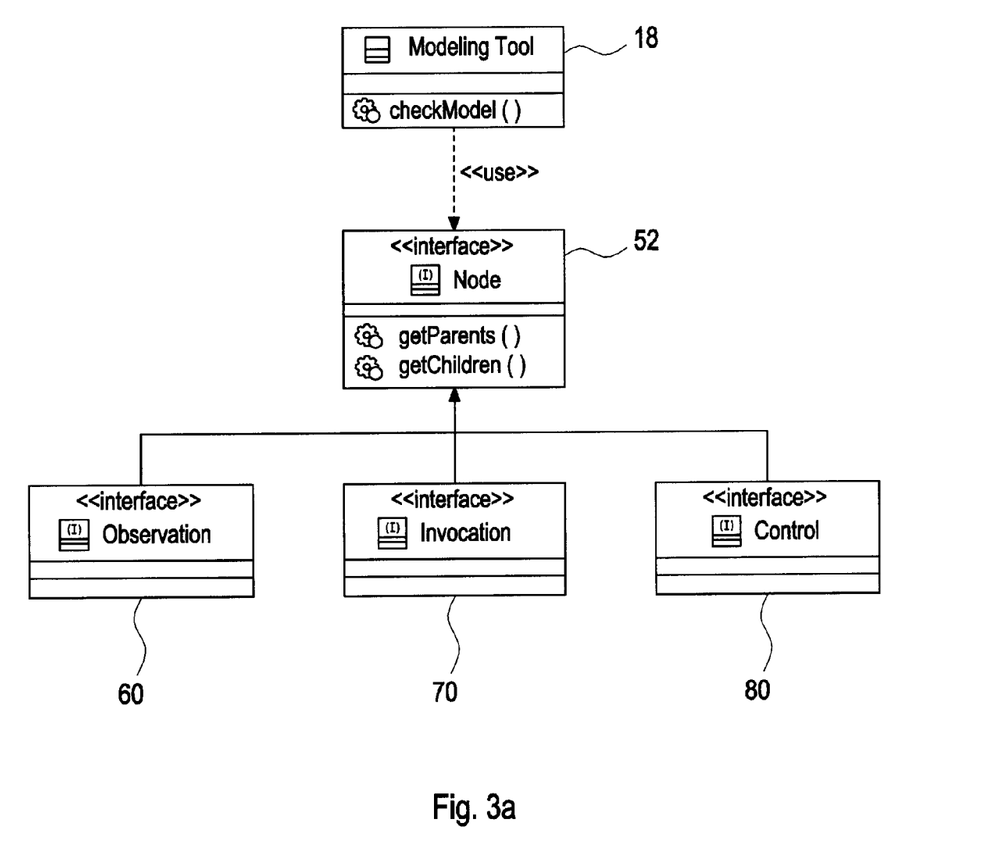
FIG. 3a, b details of nodes in the analysis performed in FIG. 2.
Figure 3B:
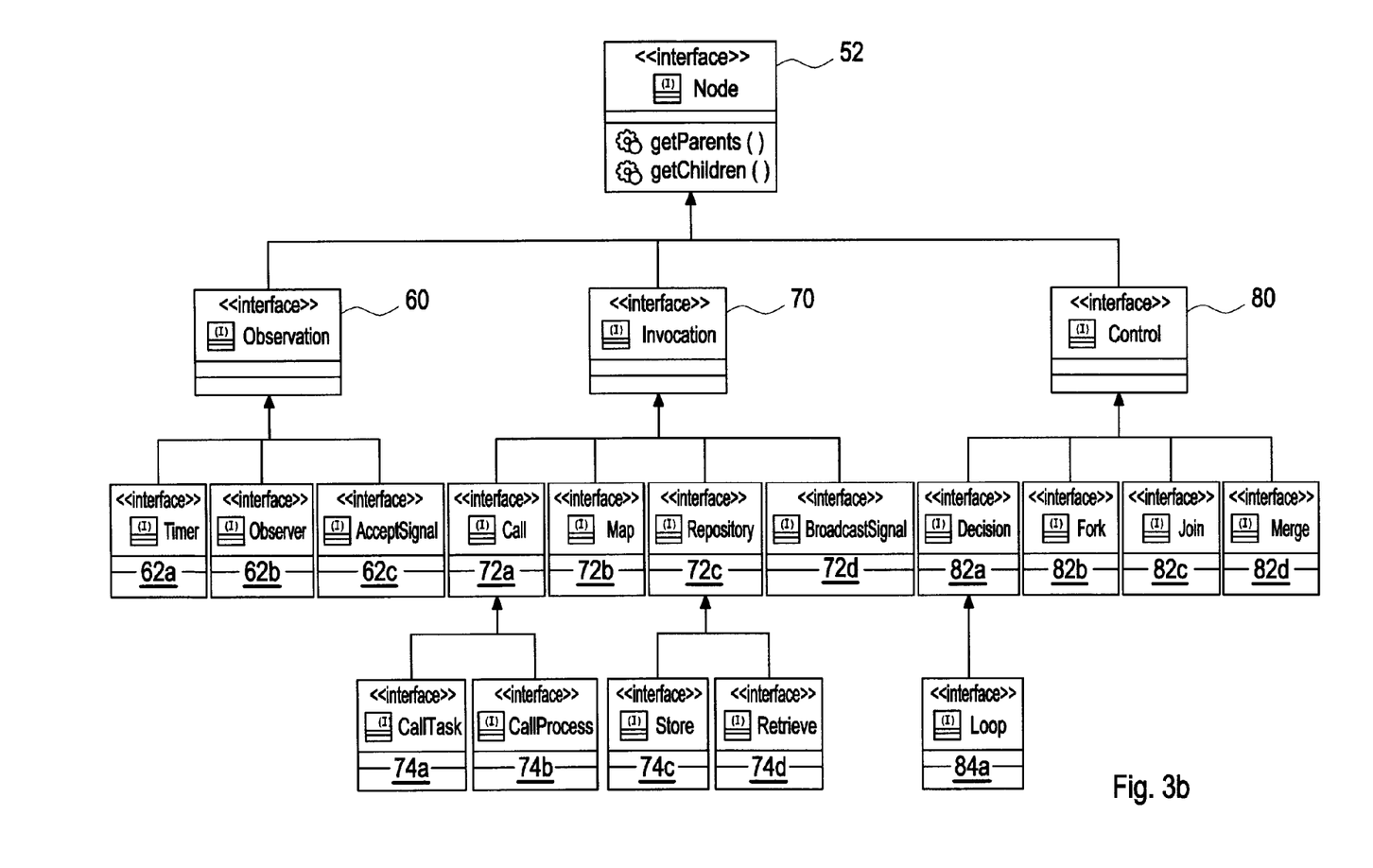

FIGS. 3a and 3b explain the node types of the nodes. A node is the basic data structure, allowing the implementation of graphs of nodes, i.e. each node may have children and parents, preferably only one parent is chosen. There are three main implementations of a node, as indicated in FIG. 3a:

an observation node type 60 implements receivers of one or more events;

an invocation node type 70 implements calls to start one or more other activities, including invocations of sub processes, tasks, services etc.;

a control node type 80 implements one or more control structures for decisions, loops, branching etc.

The invocation node type 70 can comprise call tasks with human interaction as well as call tasks without human interaction.

Possible specializations of the node types 60, 70, 80 are shown in FIG. 3b. The observation node type 60 can comprise in the next refinement level a Timer node 62a, an Observer node 62b, an AcceptSignal node 62c.

The invocation type node type 70 can comprise a Call node 72a, a Map node 72b, a Repository node 72c, a BroadcastSignal node 72d in a first refinement level, wherein the Call node 72a can comprise a CallTask node 74a and a CallProcess node 74b and the Repository node 72c can comprise a Store node 74c and a Retrieve node 74d as a next refinement.

The control node type 80 can comprise a Decision node 82a, a Fork node 82b, a Join node 82c and a Merge node 82d in a first refinement level of specialization, wherein the Decision node 82a can comprise a Loop node 84a in a next refinement level.

Figure 4:
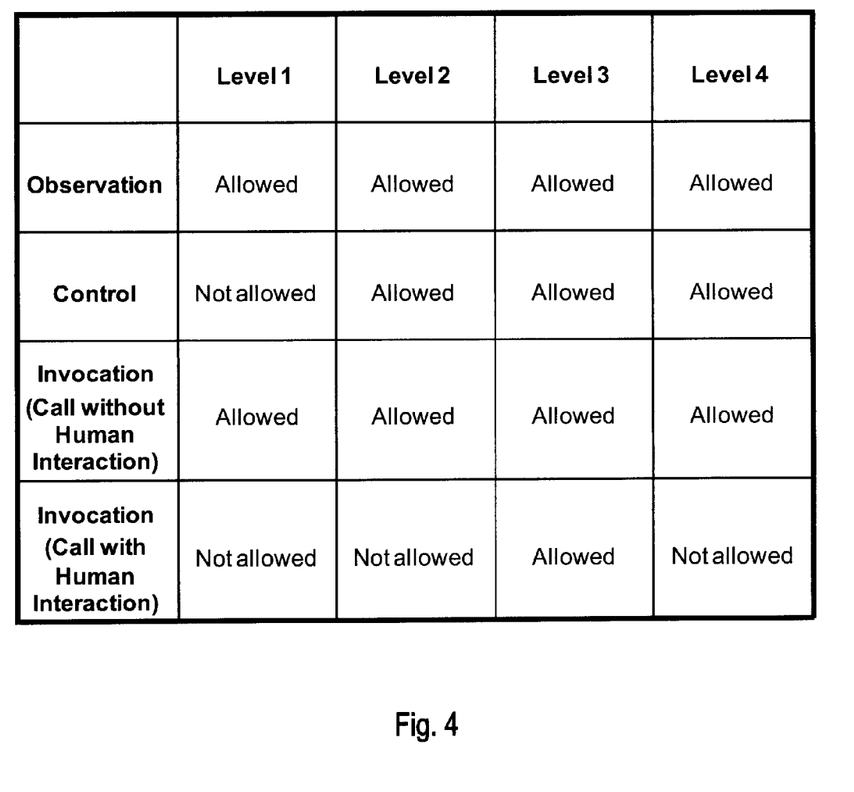
FIG. 4 a predefined decision matrix with an underlying model of the preferred method.

The depth of the nodes addressed in FIG. 2 corresponds to a notion of levels which is implemented in a decision matrix shown in FIG. 4.

The decision matrix provides at least four columns labeled level 1, level 2, level 3, and level 4, with each column representing a semantic level of an underlying model which is discussed later. Each successive column is hierarchical dependent on the preceding column, i.e. level 2 depends on level 1 (i.e. level 1 is parent to level 2), level 3 on level 2 and thus on level 1, and level 4 depends on level 3 etc.

Each node in said forest of trees of the given model which is checked in the modeling tool (FIG. 2) is compared in a breadth-first traversal manner with its depth and type to the predefined matrix. The matrix decides for each depth and type combination one of the following states to be assigned: allowed or not allowed. The evaluation automatically states if a given model complies with another model.

The observation node type is allowed in all four levels. The control node is not allowed in level 1 but in level 2 to level 4. The invocation node without human interaction is allowed in all four levels, whereas the invocation node with human interaction is only allowed in level 3. The decision matrix decides if a given model complies or not. The first level 1 and second level 2 refer to business domains whereas level 3 and level 4 refer to IT design domains. If a model does not comply with the decision matrix, the reason can easily be revealed, i.e. in which level the problem arises. A compliant model, on the other hand, is characterized by the property that the business domain can be clearly distinguished from the IT domain. Favorably this can be done within the same tool.

Figure 5:
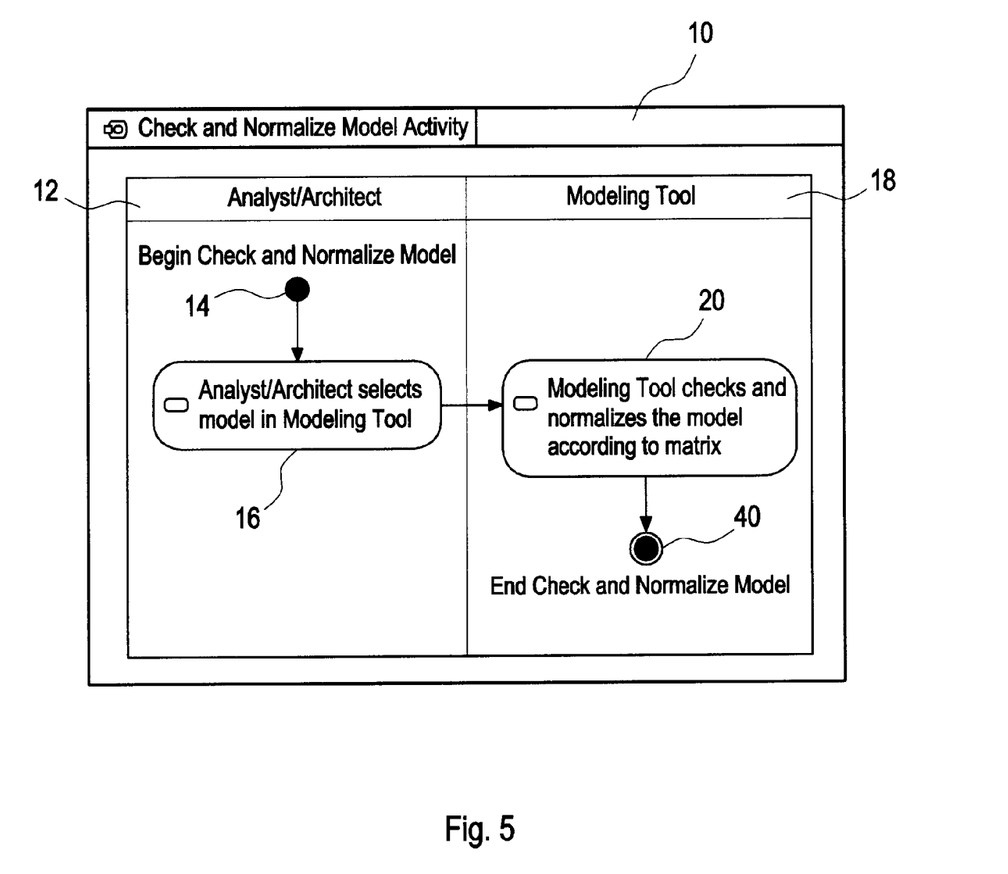
FIG. 5 a second preferred embodiment of the method according to the invention for automatic checking and normalization of a given model.

Referring now to FIG. 5, a second preferred use case is described. Additionally to a model check in the modeling tool of the second actor 18, which was already described above in FIG. 1, step 20 provides check and normalization of the model according to the underlying model contained in the preferred method.

Figure 6:
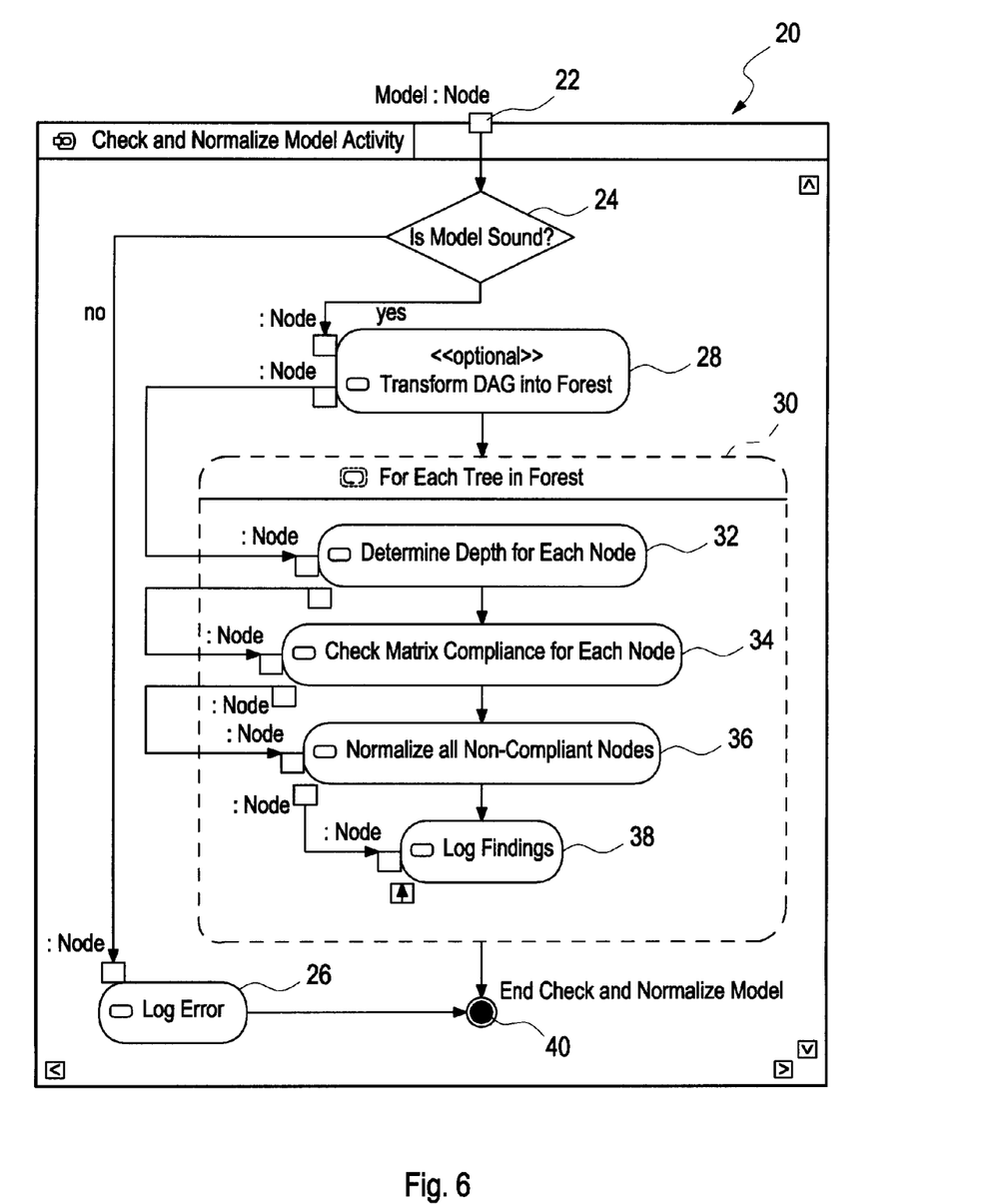
FIG. 6 a detailed process in the second preferred embodiment of the method according to the invention.

FIG. 6 shows details of the modeling check and normalization in step 20. As before in FIG. 2, it is assumed that the model which is to be checked is represented by a directed, acyclic graph (DAG). The model is entered at node 22 and checked if the model is sound (step 24). The model is considered sound if there are no loops and all nodes are connected. If the model is not sound, an entry in a log error is made (step 26).

If the model is sound the directed, acyclic graph is transformed into a forest of trees, if necessary, to simplify the further processing of the model (optional step 28). For each tree in the forest (step 30), the depth of each node is determined (step 32) and the compliance of each node with the underlying model comprised in the method is checked (step 34) as laid out in the decision matrix (FIG. 4). A non-compliant node is normalized (step 36), i.e. the model can be changed compared to its input state by performing a step according to an action matrix explained in FIG. 7. As described in FIGS. 3a and 3b the nodes have a node type chosen from a set of types. Any findings are logged (step 38), e.g. errors and observations and can be examined by the actor 18 with appropriate means outside the model check. When all trees have been checked, the model check ends (step 40).

Figure 7:
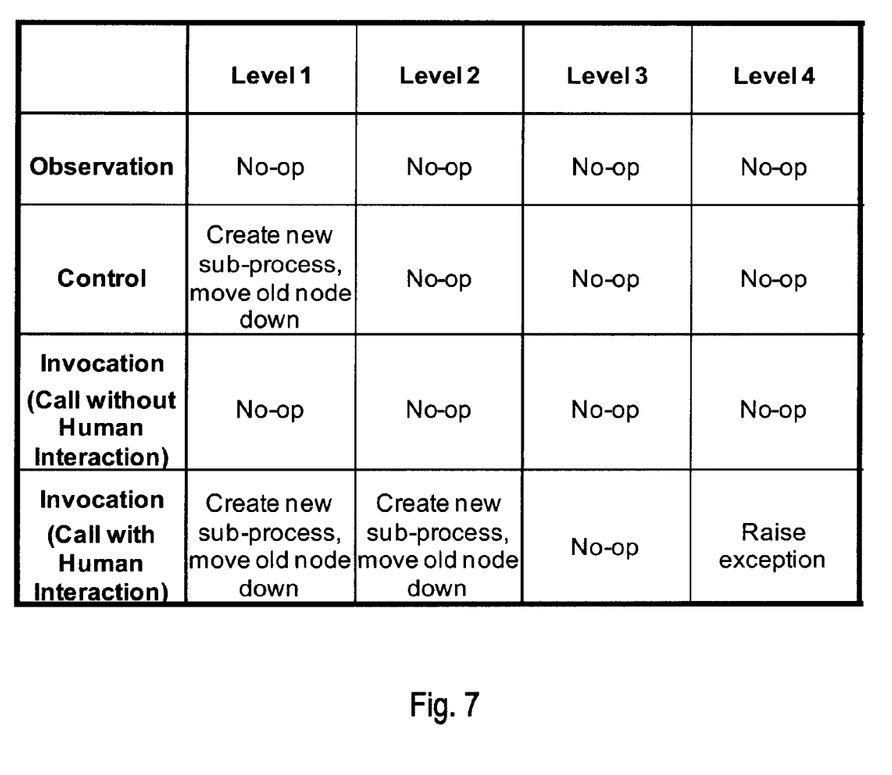
FIG. 7 a predefined action matrix with an underlying model of the preferred method.

FIG. 7 explains how the non-compliant nodes are normalized by actions laid out in the action matrix which is depicted. The levels 1 through 4 are the same as in the decision matrix in FIG. 4, as well as the node types.

No action is carried out if the node type is allowed in the actual matrix element. An element is to be understood as a row and column intersection. This is indicated by the label "no-op". If an observation node appears in level 1 through 4 no action is necessary, as observation nodes are allowed in all levels.

A control node is not allowed in level 1 but allowed in level 2 through level 4. If a control node appears in level 1, the node is moved to the next deeper level, i.e. level 2 and a new sub-tree, i.e. a new sub-process, is created if the node type is not allowed in the actual matrix element. The new sub-process is an invocation node without human interaction which is allowed in level 1 according to the decision matrix.

Invocation nodes without a call for human interaction are allowed in level 1 through level 4, no action is carried out if such an invocation node appears in any level.

Invocation nodes with a call for human interaction are not allowed in level 1 and level 2. As the comparison of depth and type of each node to the action matrix is done in a breadth-first traversal manner, an invocation node calling for human interaction in level 1 is moved to level 2 and a new sub-tree is created. When level 2 is checked, the respective node has to be moved to level 3 in the same kind, where an invocation node with human interaction is allowed.

By shifting non-compliant nodes to allowed levels and creating new sub-trees, the model is automatically normalized, i.e. repaired and brought into compliance with the matrix. As a result, a model is created which complies with the underlying model of the method, i.e. which has a well defined structure.

If an invocation node with human interaction is present in the deepest level 4 it is not possible to move this node to a deeper level. In this case, an exception handling is triggered and a respective entry is logged in the log file (step 38). Such a model has to be treated separately to remove this problem. This is typically part of some other use case and may have to be performed by a human actor. After removal of the problem the model can be tested anew with respect of compliance.

Figure 8:
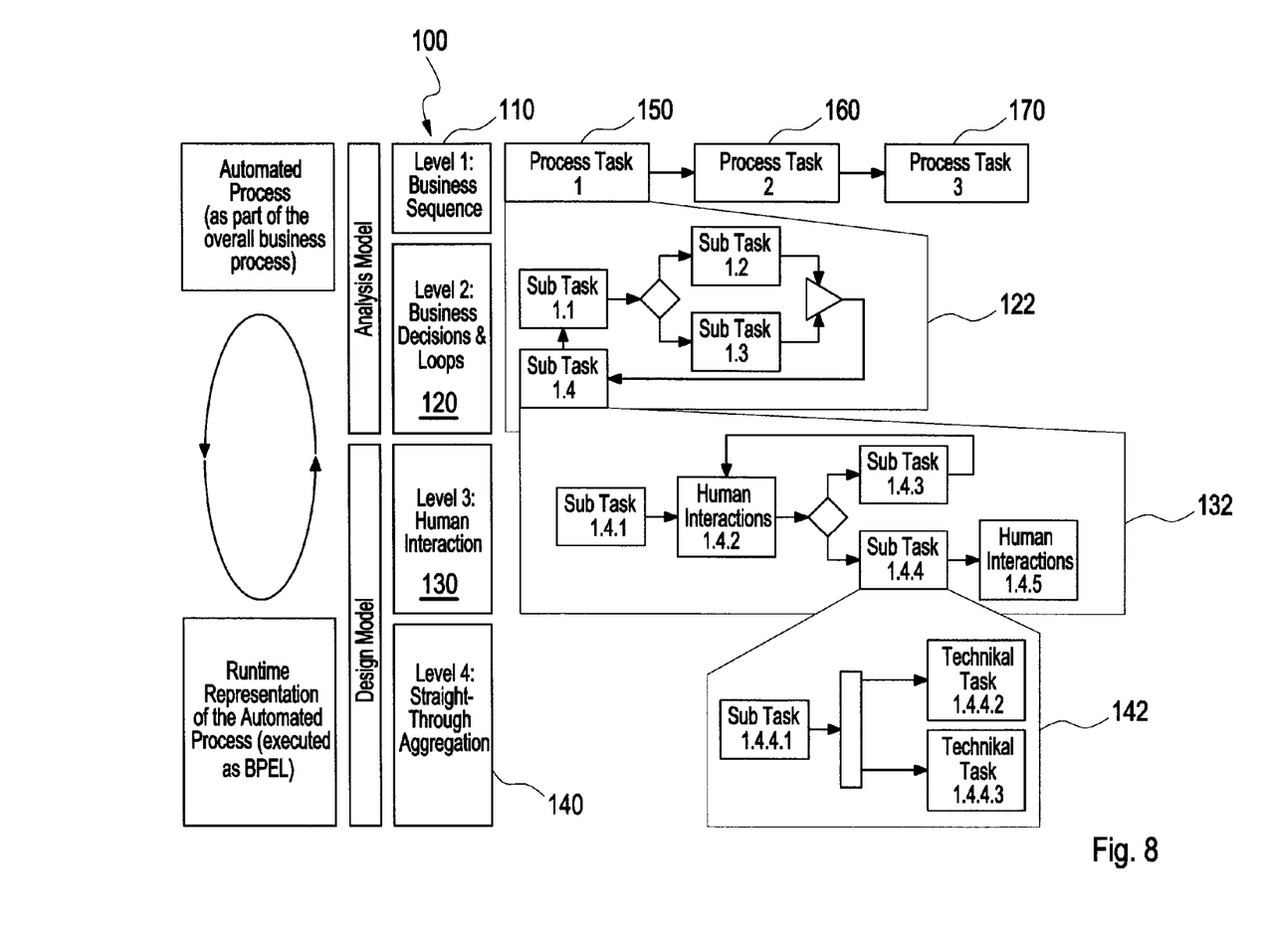
FIG. 8 a structure of a preferred model.

Details of the underlying model comprised in the decision matrix of the method are described in FIG. 8 for clarity.

The model is a meta-model for refining business requirements to realize services using decomposition. The decomposition is achieved by introducing hierarchically ordered levels, level 1 through level 4, wherein level 1 and level 2 comprise tasks and subtasks which are exclusively assigned to the domain of a business process analysis model, and level 3 and level 4 comprise tasks and subtasks which are exclusively assigned to the domain of a IT design model. Although there may be more levels provided, it is found that four levels are favorably sufficient for many cases.

The meta-model provides a clear guidance on how to compose business processes for sharing and reuse and can favorably be used for a computerized business method, which is an independent aspect of the invention. Preferably, the computerized business method for processing a graph containing a set of nodes comprises the steps of providing a forest of trees corresponding to a directed acyclic graph containing a set of nodes, each of said nodes having a type chosen from a set of types; determining a depth for each node in said forest of trees; comparing the depth and type of each node in said forest of trees to a predefined matrix, said matrix defining for each depth and type combination one of the following decisions to be carried out: compliance, non-compliance.

Preferably, a computer program product can be provided comprising a computer useable medium including a computer readable program, wherein the computer readable program when executed on a computer causes the computer to provide a forest of trees corresponding to a directed acyclic graph containing a set of nodes, each of said nodes having a type chosen from a set of types; determine a depth for each node in said forest of trees; compare the depth and type of each node in said forest of trees to a predefined matrix, said matrix defining for each depth and type combination one of the following decisions to be carried out: compliance, non-compliance.

Also preferably, a computer system can be provided for execution of a data processing program comprising software code portions for performing, when said program is run on said computer, a method for processing a graph containing a set of nodes, said method comprising the steps of providing a forest of trees corresponding to a directed acyclic graph containing a set of nodes, each of said nodes having a type chosen from a set of types; determining a depth for each node in said forest of trees; comparing the depth and type of each node in said forest of trees to a predefined matrix, said matrix defining for each depth and type combination one of the following decisions to be carried out: compliance, non-compliance.

The meta-model is comprised in the decision matrix depicted in FIG. 4 as well as the action matrix depicted in FIG. 7.

Particularly, the meta-model has semantic decomposition that structures the tasks of modeling. Contexts for sub-processes are defined. In each of the levels 1 through level 4 is a definition given what is to be expected in each level in detail, i.e. in each decomposition step. Guidance is provided where to integrate human interaction with the business processes. Semantic decomposition enforces a beneficial sequence of modeling tasks to create a predefined semantic structure. It is possible to describe the different requirements and responsibilities for tool designers. With a content-based decomposition, the work-split between business and IT domains can be achieved on business process bases.

The levels are semantic levels. Level 1 is a semantic the matrix contains a first column corresponding to a first model level defining business sequence, a second column corresponding to a second model level defining business decisions and loops, a third column corresponding to a third model level defining human and/or nonhuman interaction and a fourth column corresponding to a fourth model level defining a straight-through aggregation, wherein the first and second levels relate to a business process analysis model and the third and fourth levels relate to an IT design model.

Level 1 is the business sequence with e.g. process task 1, task 2 and task 3. Level 2 comprises business decisions and loops. Level 3 considers human interaction. Level 4 considers straight-through aggregation.

Process task 1 in level 1 can comprise in level 2 e.g. a sub task 1.1 which splits in two parallel sub tasks 1.2, 1.3 which result in a sub task 1.4. Sub task 1.4 is refined in level 3 into sub task 1.4.1, human interactions 1.4.2, which cause sub tasks 1.4.3 and 1.4.4 which result in human interactions 1.4.5. Sub task 1.4.4 for instance is refined in level 4 as sub task 1.4.41 which splits in technical tasks 1.4.4.2 and 1.4.4.3.

This way of refinement is done for each sub task in each level in process task 1 and also for the other process tasks.

Preferably, in level 1 the business sequence only allows top-level process steps without any loops and decisions. It organizes the work split for the process including accountability.

The purpose of level 1 is
Business Analysis and Review
Abstraction
Organizational accountability
Reduction of complexity
Process sharing and reuse
Understand systems or organizational boundaries.
The actions in level 1 are
Capture business requirements
Analyze service level agreement (SLA) and measurements
Establish contribution to the value chain
Establish high-level process entity model (for the data model)
Define major process actors
Derive business sequence from business services and their functional domain
Finalize starting and ending event.

Preferably, in level 2 the business decisions and loops detail business relevant process steps that need measurement or organizational visibility independent of any realization decisions.

The purpose of level 2 is
Completeness of the flow
Business rules and policies
Business understanding of the underlying technical realization
Structure of the business thinking
Decoupling decision making in the process
Enough business detail for technical automation
Business Dashboard.
The actions in level 2 are
Understand process decision structure
Detail sequence accordingly
Refine process entity model to allow business decisions
Find alternate flows
Define business exceptions
Link business relevant dashboard and monitoring events with key performance indicators (KPI).

Preferably, in level 3 the human interaction introduces manual input constraints into the business process, if required.

The purpose of level 3 is
Human task interaction as a process step
Business process driven human interaction
Individual tasks or role tasks
User interaction
Role based access control
Separation of non-process related manual task (IT operations) from human interaction process steps
Human interaction policies.
The actions in level 3 are
Detail data model for human interaction and data constraints
Understand field validation rules
Understand human control tasks
Understand data input and output
Establish user and role rights
Abstract human task groups (screen flow groups) as process steps, complex navigation included
Understand role based reporting and auditing.

Preferably, in level 4 the straight-through aggregation flow incorporates the system boundaries of the application portfolio for enterprise integration constraints of the business process or service components.

The purpose of level 4 is
Integration
Additional service components
Calls to composite business services
Auditing
Infrastructure services relevant to the process.
The actions in level 4 are
Realization decisions of process steps
Analyze application portfolio
Understand access criteria
Relate SLA and KPI
Prepare for handover to development.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer readable medium providing program code for use by or in connection with a computer or any instruction execution system. For the purposes of this description, a computer-usable or computer readable medium can be any apparatus that can contain, store, communicate, propagate, or transport the program for use by on in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

Figure 9:
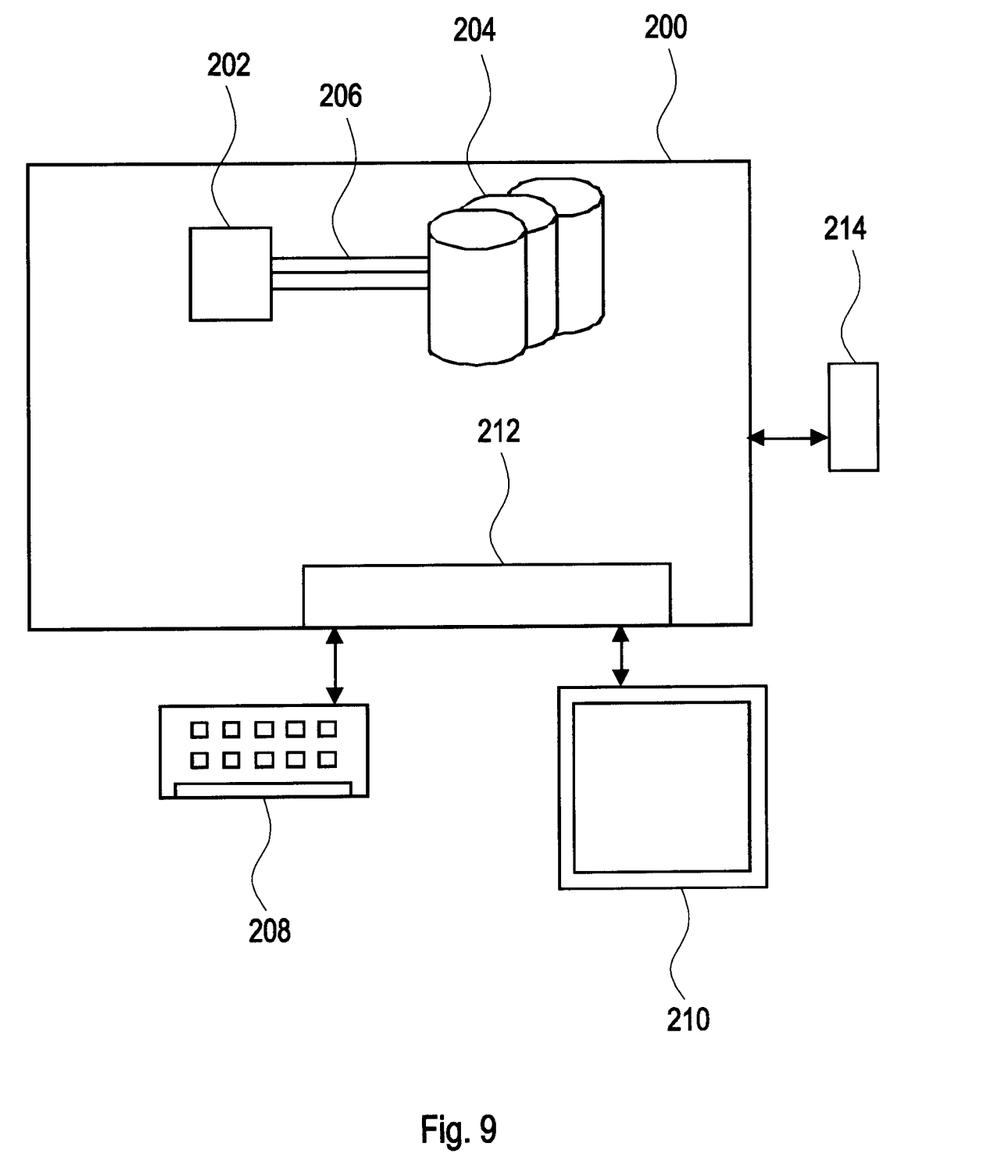
FIG. 9 a preferred computer system for performing the method according to the invention.

A preferred data processing system 200 as schematically depicted in FIG. 9 suitable for storing and/or executing program code will include at least one processor 202 coupled directly or indirectly to memory elements 204 through a system bus 206. The memory elements 204 can include local memory employed during actual execution of the program code, bulk storage, and cache memories which provide temporary storage of at least some program code in order to reduce the number of times code must be retrieved from bulk storage during execution.

Input/output or I/O-devices 208, 210 (including, but not limited to keyboards, displays, pointing devices, etc.) can be coupled to the system 200 either directly of through intervening I/O controllers 212.

Network adapters 214 may also be coupled to the system 200 to enable the data processing system or remote printers or storage devices through intervening private or public networks. Modems, cable modem and Ethernet cards are just a few of the currently available types of network adapters.

In the preferred data processing system 200 the described method for processing a graph containing a set of nodes can be performed. The processor 202 can be provided for providing a forest of trees corresponding to a directed acyclic graph containing a set of nodes, each of said nodes having a type chosen from a set of types;

determining a depth for each node in said forest of trees;

in a breadth-first traversal manner, comparing the depth and type of each node in said forest of trees to a predefined matrix, said matrix defining for each depth and type combination one of the following actions to be carried out: no action, creating a new sub-tree, triggering exception handling.

While the foregoing has been with reference to particular embodiments of the invention, it will be appreciated by those skilled in the art that changes in these embodiments may be made without departing from the principles and spirit of the invention, the scope of which is defined by the appended claims.

The invention claimed is:

1. A computerized method for processing a graph containing a set of nodes, said method comprising:

providing a forest of trees comprising two or more trees, the forest of trees corresponding to a directed acyclic graph containing a set of nodes, each of said nodes having a type chosen from a set of types comprising at least an observation node type which implements receivers of one or more events, an invocation node type which implements calls to start one or more other activities, and a control node type which implements one or more control structures;

determining a depth for each node in said forest of trees;

in a breadth-first traversal manner, checking compliance of each node in said forest of trees with a model by comparing the node depth and node type of each node in said forest of trees to a predefined matrix providing at least four columns with each column representing a semantic level of node depth and each successive one of the columns being hierarchical dependent on a preceding one of the columns, said matrix defining following actions to be carried out: no action, creating a new sub-tree, triggering exception handling based on each node depth and node type combination;

wherein no action is carried out upon determining that the node type is allowed in an actual matrix-column, a new sub-tree is created upon determining that the node type is not allowed in an actual matrix column and the not allowed node type is shifted to a next following column and exception handling is triggered upon determining that the node type cannot be shifted to the next following column;

in response to the comparing, non-compliant nodes are normalized by performing action defined in said matrix.

2. The method according to claim 1, wherein a decision matrix comprises columns each representing a level of a model, which are assigned exclusively to business analysis related domains and columns exclusively assigned to an IT design related domains, wherein allowed states and non-allowed states are assigned to nodes in the graph.

3. The method according to claim 2, wherein an observation node type is allowed in all levels.

4. The method according to claim 2, wherein a control node type is not allowed in the first level and allowed in all other levels.

5. The method according to claim 2, wherein an invocation node type without human interaction is allowed in all levels.

6. The method according to claim 2, wherein an invocation node type with human interaction is allowed only in the third level, which is assigned to IT design related domains.

7. The method according to claim 2, wherein the matrix contains a first column corresponding to a first model level defining a business sequence, a second column corresponding to a second model level defining business decisions and loops, a third column corresponding to a third model level defining human and/or nonhuman interaction and a fourth column corresponding to a fourth model level defining a straight-through aggregation.

8. The method according to claim 2, wherein each process task defined in the first level is refined into sub tasks in the second level.

9. The method according to claim 2, wherein each subtask in the second level is refined into sub tasks in the third level.

10. The method according to claim 2, wherein each subtask in the third level is refined into sub tasks in the fourth level.

11. A computer program product comprising a non-transitory computer useable storage medium storing a computer readable program thereon, wherein the computer readable program when executed on a computer causes the computer to perform a method comprising:

providing a forest of trees comprising two or more trees, the forest of trees corresponding to a directed acyclic graph containing a set of nodes, each of said nodes having a type chosen from a set of types comprising at least an observation node type which implements receivers of one or more events, an invocation node type which implements calls to start one or more other activities, and a control node type which implements one or more control structures;

determining a depth for each node in said forest of trees;

in a breadth-first traversal manner, checking compliance of each node in said forest of trees with a model by comparing the node depth and node type of each node in said forest of trees to a predefined matrix providing at least four columns with each column representing a semantic level of node depth and each successive one of the columns being hierarchical dependent on a preceding one of the columns, said matrix defining following actions to be carried out: no action, creating a new sub-tree, triggering exception handling based on each node depth and node type combination;

wherein no action is carried out upon determining that the node type is allowed in an actual matrix-column, a new sub-tree is created upon determining that the node type is not allowed in an actual matrix column and the not allowed node type is shifted to a next following column and exception handling is triggered upon determining that the node type cannot be shifted to the next following column;

in response to the comparing, non-compliant nodes are normalized by performing action defined in said matrix.

* * * * *